(12) United States Patent
Miller et al.

(10) Patent No.: US 7,628,942 B1
(45) Date of Patent: Dec. 8, 2009

(54) RESIN INFILTRATION TRANSFER TECHNIQUE

(75) Inventors: David V. Miller, Pittsburgh, PA (US); Rita Baranwal, Glenshaw, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 216 days.

(21) Appl. No.: 11/465,184

(22) Filed: Aug. 17, 2006

Related U.S. Application Data

(60) Provisional application No. 60/745,539, filed on Apr. 25, 2006.

(51) Int. Cl.
*C01B 31/02* (2006.01)

(52) U.S. Cl. ............ 264/29.1; 264/29.5; 264/257; 264/258

(58) Field of Classification Search ......... 264/29.1, 264/29.5, 29.6, 257, 258
See application file for complete search history.

(56) References Cited

U.S. PATENT DOCUMENTS

| | | | |
|---|---|---|---|
| 3,969,124 A | 7/1976 | Stewart | |
| 4,321,154 A | 3/1982 | Ledru | |
| 4,885,265 A | 12/1989 | Hillig et al. | |
| 4,978,643 A | 12/1990 | Venkataswamy et al. | |
| 5,128,074 A | 7/1992 | Steel et al. | |
| 5,494,867 A | 2/1996 | Schwab et al. | |
| 5,660,863 A * | 8/1997 | Nakano et al. | 425/85 |
| 5,698,143 A | 12/1997 | Tani et al. | |
| 5,707,471 A | 1/1998 | Petrak et al. | |
| 5,730,915 A | 3/1998 | Cornie | |
| 5,770,127 A | 6/1998 | Abrams et al. | |
| 5,840,221 A | 11/1998 | Lau et al. | |
| 5,853,653 A | 12/1998 | Donato et al. | |
| 6,013,226 A | 1/2000 | Steel et al. | |
| 6,024,898 A | 2/2000 | Steibel et al. | |
| 6,261,981 B1 * | 7/2001 | Dietrich et al. | 501/95.2 |
| 6,368,663 B1 | 4/2002 | Nakamura et al. | |
| 2004/0127600 A1 * | 7/2004 | Bauer et al. | 523/152 |

* cited by examiner

*Primary Examiner*—Joseph S. Del Sole
*Assistant Examiner*—Robert Dye
(74) *Attorney, Agent, or Firm*—Annette R. Reimers; Paul A. Gottlieb

(57) ABSTRACT

A process has been developed for fabricating composite structures using either reaction forming or polymer infiltration and pyrolysis techniques to densify the composite matrix. The matrix and reinforcement materials of choice can include, but are not limited to, silicon carbide (SiC) and zirconium carbide (ZrC). The novel process can be used to fabricate complex, net-shape or near-net shape, high-quality ceramic composites with a crack-free matrix.

3 Claims, 4 Drawing Sheets

US 7,628,942 B1

RESIN INFILTRATION TRANSFER TECHNIQUE

STATEMENT REGARDING PRIORITY

This invention claims priority from U.S. Provisional Application No. 60/745,539 filed Apr. 25, 2006.

CONTRACTUAL ORIGIN OF THE INVENTION

The present invention was conceived and developed under a U.S. Government Contract awarded by the U.S. Department of Energy. The U.S. Government has rights in this invention.

BACKGROUND OF THE INVENTION

The present invention relates to Silicon carbide fiber-silicon carbide particulate-reinforced ceramic matrix composites (CMCs) in various high temperature components in nuclear, aerospace and commercial applications.

DESCRIPTION OF THE PRIOR ART

Stewart (U.S. Pat. No. 3,969,124) discloses a method for preparing shaped articles of carbon, graphite and mixtures thereof that have low porosity and relatively high bulk density. These shaped carbon and graphite articles are reinforced with reinforcing materials such as fibers and whiskers. The carbon and graphite articles are prepared by combining carbonaceous particles of predetermined particle size and particle size distribution with a polymeric resin and shaping the resin and particles into an appropriate article. The objective of this invention is to produce carbonaceous articles with as high of a density as possible. The disadvantage is the articles must be graphitized and sintered after heating to elevated temperatures to achieve the goal Steel (U.S. Pat. No. 6,013,226) discloses a process for the production of metal-containing refractory materials, refractory materials obtainable thereby and to compositions ("blanks") for use in said process. EP-A-0373761 further discloses a process in which a thermoformable carbon-containing precursor composition having defined viscosity characteristics is formed into a blank to which isostatic pressure is applied using an appropriate gaseous medium. This invention teaches a process for producing a metal carbide-containing refractory material wherein a blank comprising a reactive metal source and a carbon-containing precursor is pyrolysed under fluid pressure. The disadvantage of this is that most applications require for the refractory product of the process to be substantially free from porosity, or at least substantially free from voids, especially voids of irregular size. In such circumstances the blank itself should be substantially free from such voids, and, when a substantially wholly non-porous product is required, free from substantially any porosity at the start of the process. Thus, the pressure used in the process will have to be substantially high.

Donato (U.S. Pat. No. 5,853,653) discloses manufacturing SiC/SiC fibers of high density by a production process based on the infiltration into ceramic fiber materials of a polymeric precursor solution containing, as filler, inert powders of lower size than the mean distance among the ceramic fibers used as basic materials for the manufacturing of CMCs and typically having a nanometric granulometry. Such infiltration step is followed by the steps of material hardening and polymer pyrolysis, and by repeated thickening (densifying) steps until the desired density is reached.

Polymer infiltration and pyrolysis (PIP) processing similar to the approach highlighted in this patent is utilized by various researchers and manufacturers to produce high-temperature composite structures. In PIP processing a low density preceramic polymer is infiltrated into the cloth or part, cured and pyrolyzed at a temperature that provides the desired material (e.g. silicon carbide or silicon nitride). During this high temperature pyrolysis cycle, a weight loss results and the density of the starting material increases as it is converted from a low density polymer to a higher density ceramic. These combined characteristics result in a large volumetric reduction of the preceramic polymer during the high temperature pyrolysis cycle.

Fiber-reinforced composites can be produced using a tow of reinforcement that is wrapped around a preform to achieve the desired architecture. Alternatively, the tow can be woven into fabric that is used in a lay-up process. A tow consists of hundreds of individual fibers of similar diameter (several microns to tens of microns) that are held together with a sizing to provide a workable material for tow winding or fabric weaving. Fiber-reinforced composite materials processed using a PIP approach contain preceramic polymer that is located within the tows, in the void space between the reinforcing phase and between the layers when a lay-up approach is used. Particulate-reinforced composites contain preceramic polymer that is located in the void space between the particles.

In composites possessing either fibers or a highly loaded particulate reinforcement, the reinforcing phase does not shrink during pyrolysis. Therefore, to accommodate the volumetric reduction of the preceramic polymer, cracks in the matrix phase result. To minimize the amount of shrinkage in the matrix phase it is a common practice to include inert particle additions to the preceramic polymer resin prior to introducing it to the reinforcing phase. These inert particle additions typically possess the same phase as the desired product resulting after pyrolysis of the preceramic polymer (e.g., silicon carbide). During pyrolysis of the preceramic polymer the inert filler does not undergo any volumetric reduction, thereby decreasing the shrinkage of the matrix phase during pyrolysis. Therefore, the goal is to begin with as much inert particle addition between the reinforcing phase as possible to reduce the amount of the shrinkage in the matrix phase, and decrease the number of PIP cycles required to achieve the desired matrix density.

SUMMARY OF THE INVENTION

One object of the invention is to produce a high-quality composite having the ability to fabricate complex structures with the desired loading levels. Such object is achieved according to the invention by fabricating composite structures using either reaction forming or polymer infiltration and pyrolysis techniques to densify the composite matrix.

In the present invention, there is provided a novel method for producing a fiber-reinforced composite with a crack-free matrix by utilizing a reaction forming and polymer infiltration and pyrolysis technique. The process involves the interaction of one reactant (e.g, carbon) with a gas or molten metal (e.g., silicon) resulting in complete reaction of two reactants to form one phase. In the case of carbon and silicon, carbon reacts with silicon to form silicon carbide (SiC). The advantages of reaction forming include ease of processing, near-net shape part fabrication, and a reduced number of required processing steps when compared to other conventional ceramic matrix composite fabrication techniques (e.g., chemical vapor infiltration).

In a reaction formed composite, many applications require the amount of unreacted silicon present in the final product to be minimized. Achieving this goal requires a high concentration of carbon in the porous preform that can be converted to silicon carbide during the reaction forming process.

The maximum amount of carbon that can be incorporated into a non-reinforced preform varies from 42.7 volume percent for graphite (p=2.25 g/cm$^3$) to 64.1 volume percent for amorphous carbon (p=1.5 g/cm$^3$). However, care must be taken not to increase the carbon content above a critical limit or the product will form impervious pore channels that choke-off subsequent infiltration of gas or liquid into the remainder of the part. The addition of a high volume of fiber reinforcement and/or particulate reinforcement reduces the number of viable part processing techniques. The high reinforcement volume constrains the part during subsequent processing steps (e.g., curing and pyrolysis) and forces any volumetric changes (e.g., shrinkage) to occur in the matrix regions between the reinforcement.

Conventional approaches, such as resin transfer molding, for processing parts with high loadings of fiber- or particulate-reinforcements use suspensions of SiC and/or graphite particles dispersed in a carbonaceous resin. These suspensions are injected into a preform containing fibers or particles, and the carbonaceous resin is subsequently cured. During pyrolysis of the carbonaceous resin, shrinkage occurs within the matrix region resulting in large matrix region fissures. These fissures possess little carbon-containing filler and result in large undesirable interconnected regions ("veins") of silicon in the final product.

Other objects, aspects, and advantages of the present invention will be pointed out in or will be understood from the following detailed description provided below in conjunction with the accompanying drawings.

DETAILED DESCRIPTION OF THE INVENTION

Figure 1:
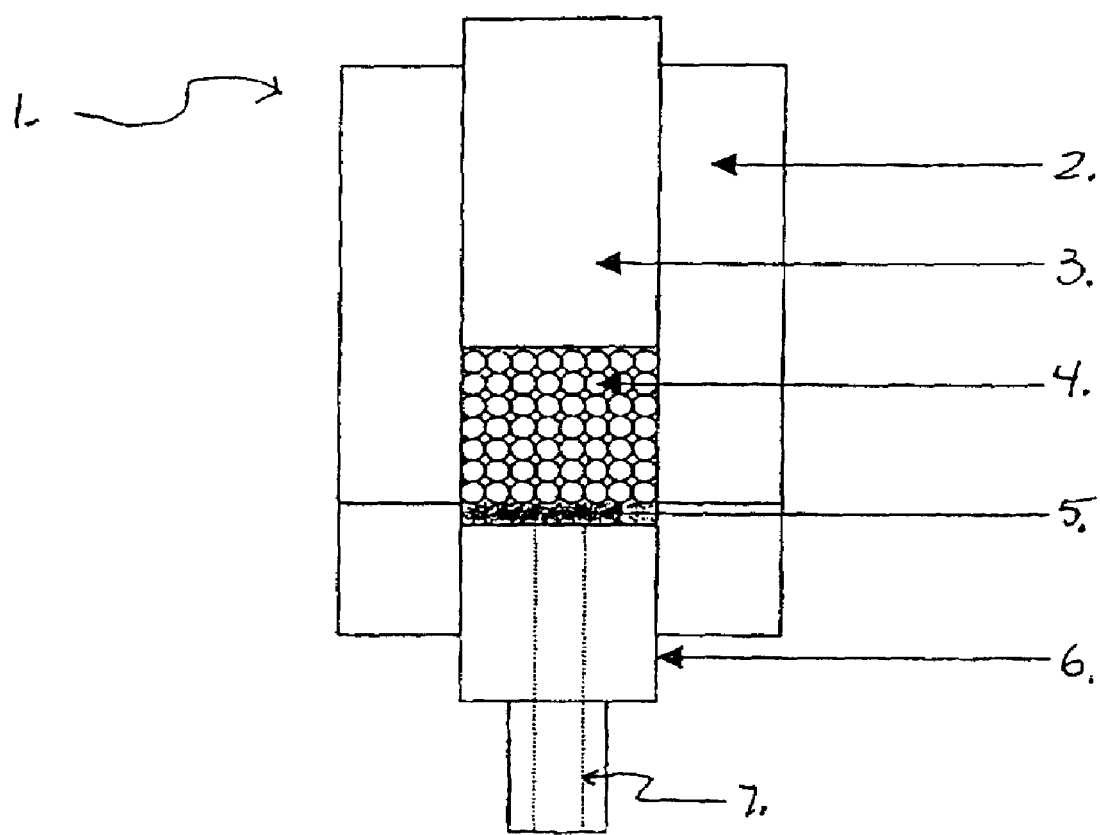
FIG. 1 is a Mold Assembly with Reinforcement Media Addition.

A preferred embodiment of this invention comprises a process for producing a component with high SiC loading (fiber or particulate) that contains no large Si fissures as currently produced with existing technology. Such fissures result from matrix shrinkage prior to infiltrating the preform with molten silicon. FIG. 1 provides a schematic representation of the mold assembly 1 shown with a reinforcement media 4, a fitting with a hose connection 6, and a hose 7. The mold 1 is shown assembled with a filter 5 at the bottom to retain the reinforcement media 4 and subsequent SiC grit 8 additions in the mold 1. Also, the porous filter 5 provides a means to allow the resin system to wet the mold 1 as discussed in subsequent diagrams. The mold 1 is first loaded with the reinforcement media 4 (fibers or particles) and tapped or vibrated with the weight 3 in place. This allows for maximum packing density of the reinforcement media 4.

Figure 2:
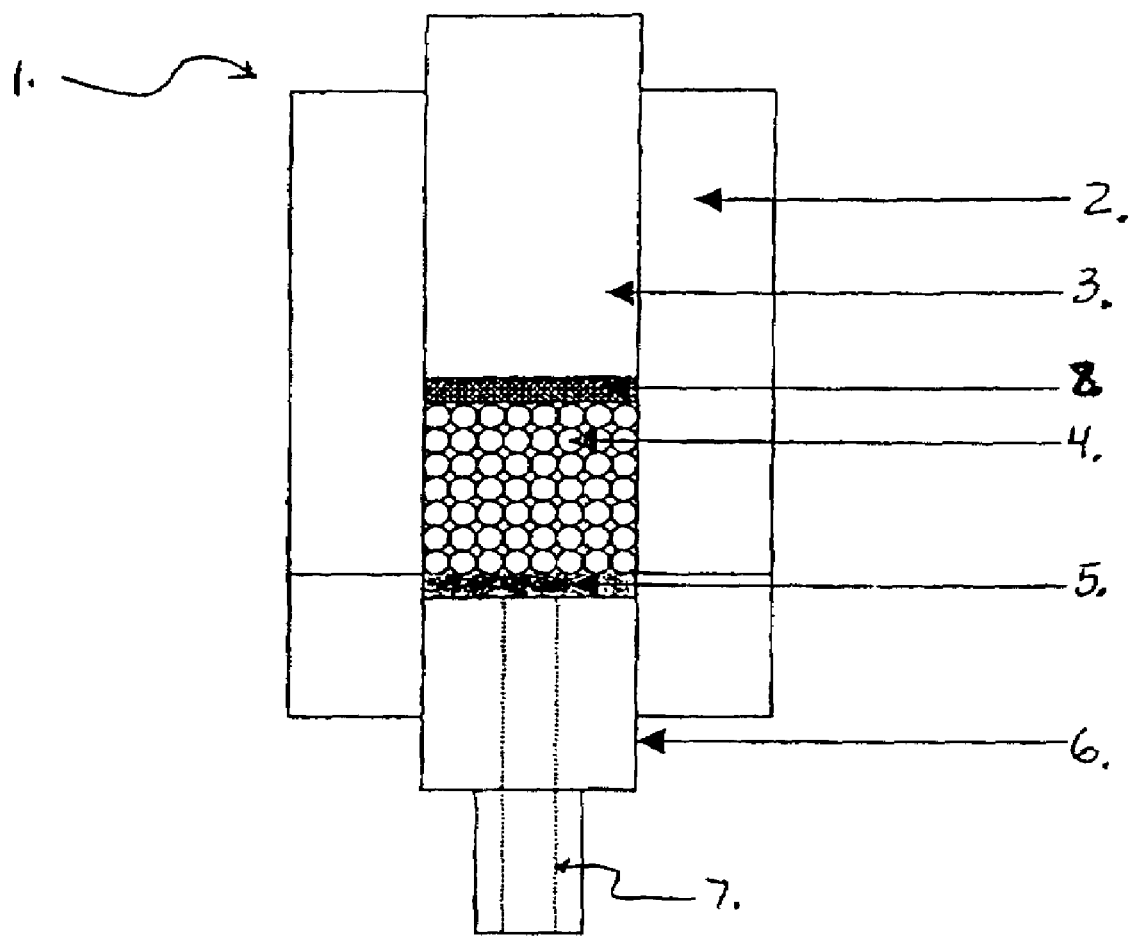
FIG. 2 is a Mold Assembly with Reinforcement Media and SiC Grit Additions.

The weight 3 is then removed and SiC grit 8 is added into the mold 1 on top of the reinforcement media 4 (fibers or particles). The weight 3 is then placed back in the mold 1 and the mold 1 is either tapped or vibrated to maximize the packing of SiC grit 8 between the reinforcement media 4 (FIG. 2). Maximum grit packing is achieved by mixing various particle sizes of SiC grit 8 together to obtain a particle size distribution that results in a very high packing fraction (e.g., >60 volume percent). The example demonstrated in the laboratory used a mixture of 70 volume percent 280 grit SiC and 30 volume percent 800 grit SiC. The weight 3 shown in FIG. 2 is used to maintain the dense packing of the reinforcement media 4 that was achieved during the process described in FIG. 1. This weight 3 does not aid in packing the SiC grit 8 between the reinforcement, because once the SiC grit 8 settles from the top surface, no load is being applied on the grit 8 from the weight 3. Thus, it is extremely important to choose a particle size distribution of the grit particles that will result in the highest possible particle packing the interstices of the reinforcement media 4 during tapping with no applied load.

Figure 3:
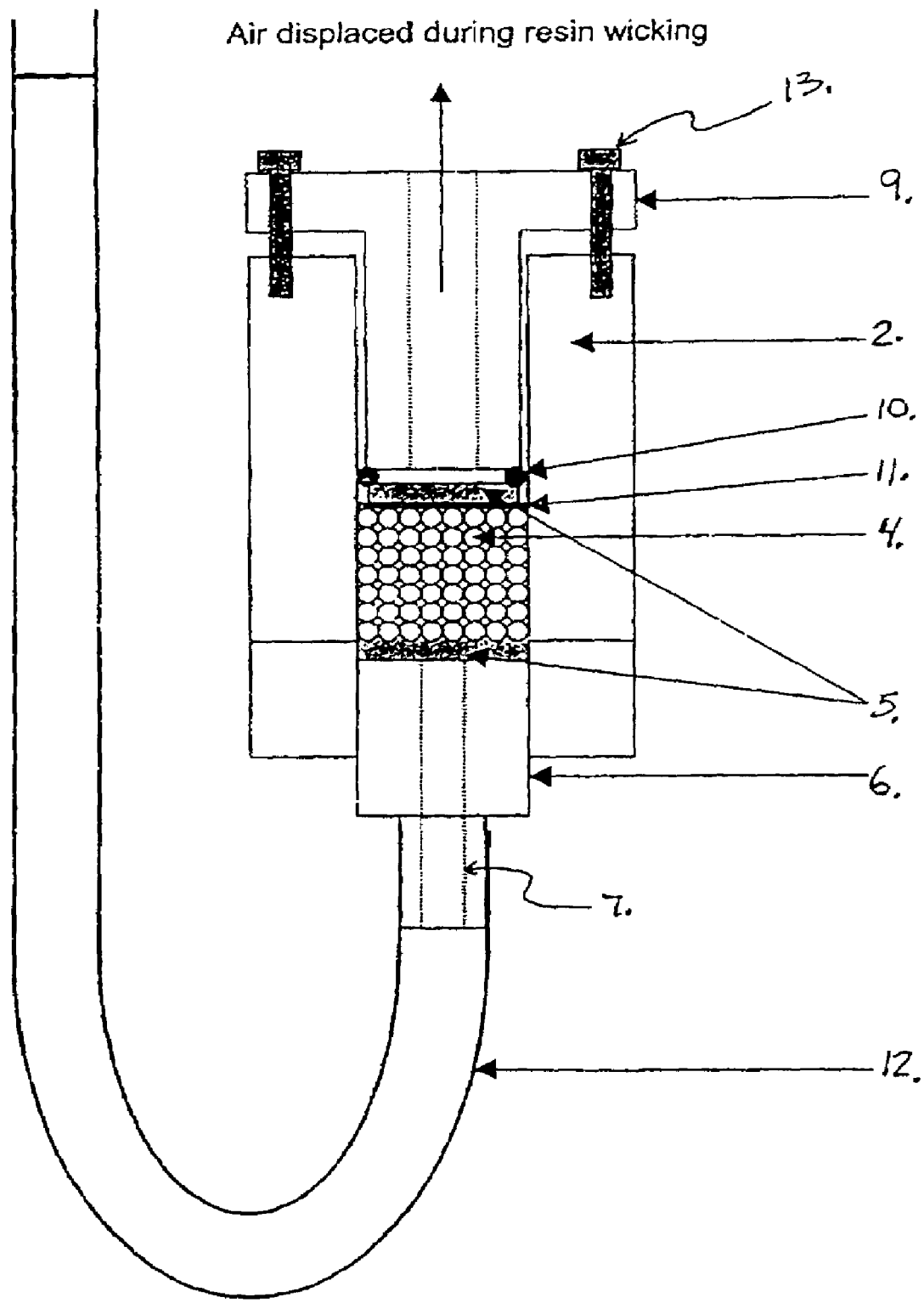
FIG. 3 is the Wicking of Resin into the Mold containing a Preform.

After the SiC grit 8 addition, the weight 3 is removed and a piece of filter paper 11 is placed on top of the part to provide a partitioning line between the infiltrated part and excess resin after subsequent processing (FIG. 3). A metal filter 5 is then placed on top of the filter paper 11, followed by an o-ring 10. The top holder 9 is then positioned in the mold 2 and bolted 13 down if required. The tubing 12 is filled above the top of the mold 2 with a carbonaceous resin system.

During the tube filling process, it is critical to have a pathway out of the part and mold 2 for air in the tube 12 that is displaced by resin. This is achieved by the porous filters utilized, and the hole through the center of the top holder 9. If the air in the tube 12 was not allowed to escape, the tube 12 would not completely fill with carbonaceous resin preventing wicking into the mold 2.

After filling the tubing 12, the carbonaceous resin wicks into the part via capillary action and can completely wet the part. The filter 5 on top of the filter paper 11 aids in promoting complete wetting of the part. The o-ring 10 is in position to prevent resin from wetting the exterior of the top holder 9. During wicking, air is also displaced from the part and must have a path to travel or complete wicking of the carbonaceous resin will not result. The top holder 9 facilitates this by holding the part in position while allowing displaced air to exit though the hole in its center.

Figure 4:
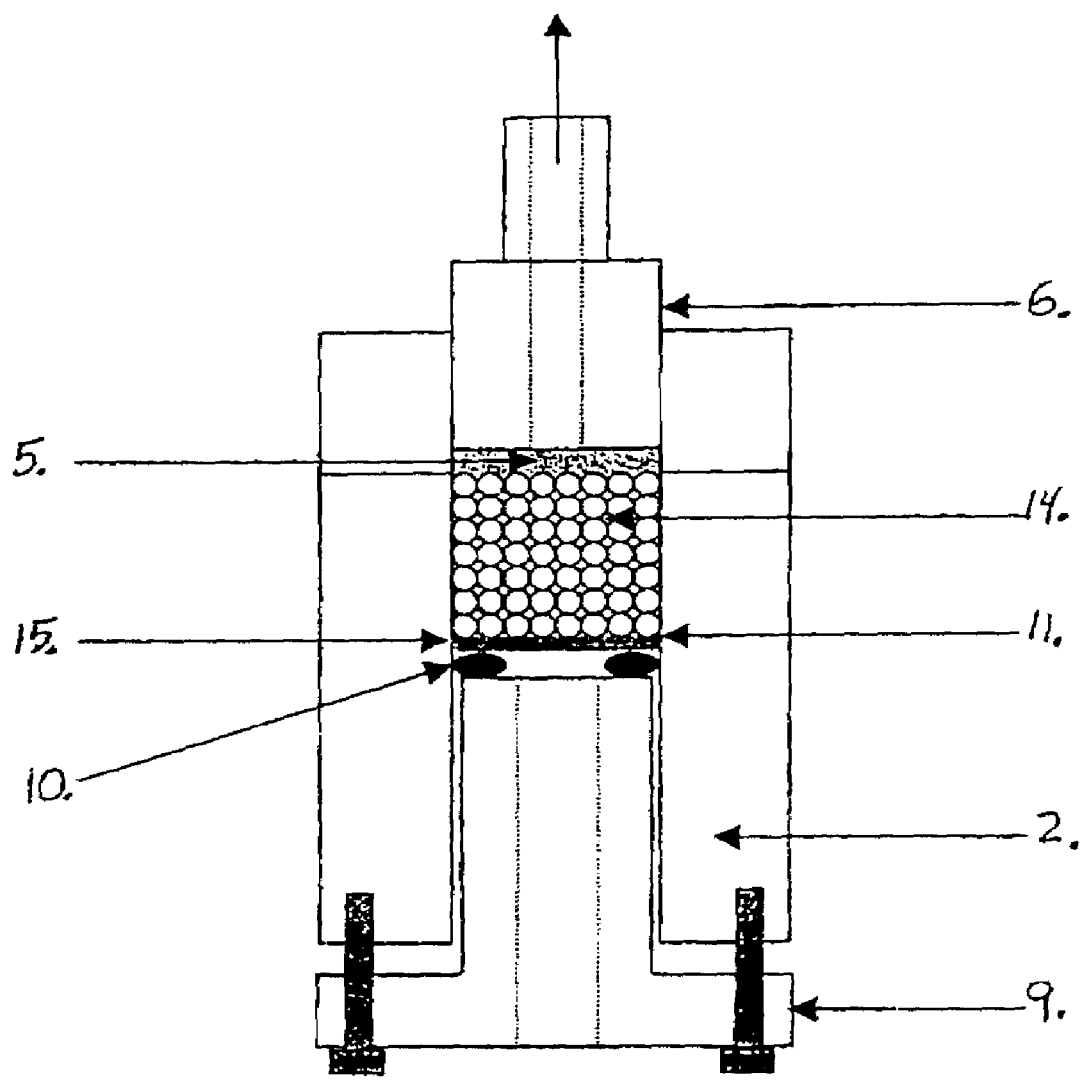
FIG. 4 is the Curing of Resin Infiltrated Part inside Metal Mold.

Once the wicking process is complete, the top holder 9, o-ring 10 and filter 5 are removed. An impervious metal disk 15 is placed on top of the filter paper 11 followed by an o-ring 10. The top holder 9 is then replaced and screwed into position. This crushes the o-ring 10 and helps provide a hermetic seal. The tubing 12 is removed, and the mold 1 is inverted and placed in an oven to cure the carbonaceous resin 14 (FIG. 4). During the curing process, the resin 14 undergoes a condensation reaction that produces water as a by-product. The mold 1 is inverted during this process to force any water vapor out of the mold 1, and away from the part.

After curing, the part 14 is removed from the mold 1 and pyrolyzed to convert the resin 14 into amorphous carbon. The part 14 is then placed in a bed of silicon and heated above the melting point of silicon (1410° C.). Upon melting the silicon wets and infiltrates the part 14, converting the amorphous carbon formed in the matrix region into SiC via the chemical reaction between the two components. The final part contains the large volume fraction of reinforcing phase, SiC grit, SiC from the reaction forming process and a small amount of unreacted silicon.

The preferred embodiment of the invention for producing preforms that can be converted to composites via reaction forming is very flexible. Mold modifications can be made to fabricate various geometry parts with either fiber or particulate reinforcements. Net-shape or near-net shape components can be fabricated with the novel process due to high packing fractions of the fiber and/or particulate reinforcements that prevent part shrinkage during processing.

Polymer Infiltration and Pyrolysis

The process described in the reaction forming section can also be used to fabricate parts with reinforcement media using the PIP process to densify the matrix. A preceramic polymer sold under the trademark KiON VL-20 was selected for this evaluation because it is a low viscosity, commercially available polysilazane that is relatively moisture insensitive with a high SiC yield. In PIP processing a preceramic polymer is infiltrated into the matrix region of a part by one of several processing techniques (e.g., resin transfer molding). The preceramic polymer is then cured and heated to an elevated temperature (e.g., >1400° C.) to convert the preceramic polymer into a ceramic. During this heating process the low density polymer ($p=1.2$ g/cm$^3$) is converted into a higher density ceramic ($p_{sic}=3.21$ g/cm$^3$). The shrinkage associated with this change in density is approximately 70 volume percent in a constrained system such as a highly loaded fiber- or particulate-reinforced composite, the preceramic polymer in the regions between the reinforcement will shrink and crack. The matrix density is increased by returning the part to a bath of the preceramic polymer and displacing the air in the part with the liquid resin. The resin is cured and the part is pyrolyzed again at temperatures appropriate to produce a crystalline ceramic. The PIP process is repeated several times until the desired matrix density is achieved.

To minimize the number of PIP cycles, it is desirable to have a filler material in addition to the preceramic polymer. The filler material is selected to occupy as much volume as possible between the reinforcement phase, and not shrink during the pyrolysis cycle. Previously evaluated techniques for introducing this filler material include particle/liquid suspensions used for resin transfer molding The filler material is mixed with the preceramic polymer and dispersed to achieve a very high loading level (50 to 60 volume percent). This suspension is then injected into a mold containing the desired reinforcement (i.e., fiber or particulate). The resultant part is cured and pyrolyzed, and the PIP cycle is repeated to increase matrix density.

While the PIP process works well for fabricating composite parts with large amounts of the desired reinforcing phase, large cracks in the matrix phase exist. These cracks result from the same mechanism described above in the reaction forming process. Namely, the high reinforcement volume constrains the part during subsequent processing steps (e.g., during and pyrolysis) and forces any volumetric changes (e.g., shrinkage) to occur in the regions between the reinforcement. Cracks that result prior to reaction forming contain very little carbon and result in undesirable veins. A of silicon in the final part. In PIP processed parts, the resultant cracks are subsequently filled with preceramic polymer resin and converted to SiC upon pyrolysis. However, the cracks are not completely filled with ceramic due to the shrinkage of the preceramic polymer upon pyrolysis, and some degree of cracking is prevalent in the final part.

The processing procedures implemented to produce parts using a carbonaceous resin described in the previous section were also used to fabricate parts with preceramic polymer in the matrix region. Molds were filled with a reinforcing media followed by filling the interstices of the reinforcement media with a bimodal distribution of SiC grit (70 volume percent 280 grit and 30 volume percent 800 grit). The preceramic polymer replaced the carbonaceous resin in this approach, and wicked into the part preform. After wicking was complete, the part was cured in the mold. The cured part was demolded and pyrolyzed at 1600° C. in vacuum to convert the preceramic polymer to crystalline SiC. The pyrolyzed part was immersed in a bath preceramic polymer displaced in the air in the part. The part was cured and pyrolyzed. This process (PIP) of vacuum impregnating and pyrolyzing was repeated for a total of twelve (12) cycles at 1600° C. to produce a part with less than 10% porosity.

Other Matrix Materials

While this process has been demonstrated for SiC matrix materials, the potential extends into a variety of other matrix materials. The process can be used for producing composites with various reinforcing and matrix phases. An example of this is the ability to produce a zirconium carbide (ZrC) matrix using the present invention approach for preform fabrication. The pyrolyzed part would be replaced on a bed of zirconium instead of silicon. Heating above the melting point of zirconium (1852° C.) would result in the molten zirconium wicking into the structure and producing a ZrC matrix phase.

We claim:

1. A process for producing:

composite parts reinforced with fiber or particulate additions with a dense matrix phase having a metal mold, a weight, a porous filter, a reinforcement media, a hose, a top holder, a metal filter and comprising the steps of:

a) loading the mold with the reinforcement media;

b) tapping the mold with the weight with no applied load to allow for maximum packing density of the reinforcement media;

c) removing the weight and adding SiC grit having 70 volume percent 280 grit SiC and 30 volume percent 800 grit SiC into the mold on top of the reinforcement media to obtain a particle size distribution that results in a very high packing fraction;

d) placing the weight back in the mold and tapping to maximize packing of SiC grit between the reinforcement media and to minimize shrinkage during subsequent processing;

e) removing the weight and placing a filter paper on top of the reinforcement media;

f) placing the metal filter on top of the filter paper and placing an o-ring on top of the metal filter;

g) positioning and securing the top holder in the mold;

h) filling the hose above the top of the mold with a carbonaceous resin, such that the resin enters the mold from the bottom of said mold;

i) wicking the resin into a preform via capillary action and completely wetting the preform inside the mold;

j) removing the top holder, o-ring and metal filter once wicking is complete;

k) placing an impervious metal disk on top of the filter paper and placing the o-ring on top of the metal disk;

l) replacing and securing the top holder to the mold to crush the o-ring and to provide a hermetic seal;

m) removing the hose;

n) inverting the mold to force any water vapor out of the mold and away from the resin;

o) placing the mold in an oven to cure the resin;

p) removing the resin from the mold and pyrolyzing to convert the resin into amorphous carbon;

q) placing the resin on a bed of silicon and heating above 1410 degrees Celsius; and r) melting the silicon to wet and to infiltrate the resin to convert the amorphous carbon into SiC.

2. The process according to claim 1, wherein a net-shaped or near-net-shaped composite is produced.

3. The process according to claim 1, wherein the maximum amount of carbon is 64.1 volume percent for amorphous carbon.

* * * * *